United States Patent Office 2,752,390
Patented June 26, 1956

2,752,390

1,5-DIHYDROXYNAPHTHALENE KETO ALKANOIC ACIDS

Robert R. Burtner, Skokie, Ill., assignor, by mesne assignments, to G. D. Searle & Co., Skokie, Ill., a corporation of Delaware No Drawing. Application December 29, 1951,
Serial No. 264,245

4 Claims. (Cl. 260—520)

This invention relates to keto acids derived from 1,5-dihydroxynaphthalene, to salts thereof, and to methods of producing such acids. In particular it relates to carboxylic acids of the general structural formula

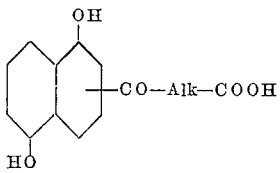

wherein Alk is a saturated bivalent aliphatic hydrocarbon radical.

This application is a continuation-in-part of my copending application Serial No. 18,285, filed March 31, 1948, now U. S. Patent No. 2,590,086 dated March 25, 1952.

In the foregoing general structural formula Alk represents saturated bivalent aliphatic hydrocarbon radicals containing two to five carbon atoms, such as lower alkylene radicals like ethylene, propylene, trimethylene, butylene and the like. As used herein the term "alkylene radical" stands for a bivalent radical derived from a saturated aliphatic hydrocarbon, which may be straight- or branched-chained.

The compounds of this invention are useful in the preparation of complex organic compounds which are of value in the synthesis of steroids, dyestuffs, and pharmaceuticals. The compounds are also of value as antiseptics, antitoxidants, pharmaceuticals, and insecticides. Certain of them are useful as choleretic agents. It is the object of this invention to provide useful substances for the foregoing purposes, as well as to provide efficient methods for their manufacture.

Compounds of this invention can be produced by reacting a compound of the formula

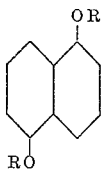

where R is lower alkyl with an anhydride of a dibasic aliphatic acid or with a carbalkoxy alkanoyl halide in the presence of a Friedel-Crafts catalyst such as anhydrous aluminum chloride, anhydrous ferric chloride, stannic chloride, anhydrous zinc chloride, boron trifluoride, hydrogen fluoride, and related compounds in a solvent which has lower reactivity than the hydroxy or alkoxy naphthalene. Among such solvents are nitrobenzene, carbon disulfide, tetrachloroethane, chlorobenzene, and similar solvents. Subsequent to the condensation, quenching of the reaction mixture and removal of solvent, the product is dissolved in alkali, and the desired keto acid can be obtained in relatively pure form by acidification of the alkaline solution. Among the acid anhydrides which can be used in my process to prepare substances to which this invention pertains are succinic, glutaric, adipic, pimelic, and subaric, as well as alkylated derivatives of dibasic acids such as pyrotartaric, ethyl succinic, methyl adipic, and related acids.

Salts of the keto acids to which this invention relates may be obtained by neutralization of the acids with organic or inorganic bases such as sodium carbonate, sodium hydroxide, potassium bicarbonate, calcium hydroxide, ammonium hydroxide and ammonium carbonate; methylamine, dimethylamine, ethylamine, and related mono-, di- and tri-alkylamines; alkanolamines such as ethanolamine, isopropanolamine, tri-ethanolamine, diethylaminoethanol; and strong heterocyclic amines which are aliphatic in character, including morpholine, piperidine, and related substances.

Alkaline salts of these acids may be prepared by solution of the acid in an alkaline carbonate solution, such as sodium carbonate, followed by salting-out with a salt, as for example sodium chloride. Likewise such salts may be prepared by treatment of an alcoholic solution of the acid with an alcoholic solution of alkali. The salts are often insoluble in alcohol and may be obtained as precipitates. In other cases another solvent such as ether or benzene may be added to throw down the salt. Salts of aliphatic amines may be obtained by treating a solution of the acid in an organic solvent with a solution of the amine in a similar solvent and precipitating the desired salt with another miscible solvent in which the salt is insoluble.

My invention is further disclosed by means of the following examples, which are set forth for the purpose of illustration and which in no way are to be construed as limiting my invention in spirit or in scope. It will be apparent to those skilled in the art that innumerable conventional modifications in solvent, temperature, catalyst and reagents can be adopted without departure from the intent and purpose of this invention. Quantities of materials are given in parts by weight unless otherwise noted, and temperatures are given in degrees centigrade (° C.).

*Example 1*

188 parts of 1,5-dimethoxynaphthalene and 100 parts of succinic anhydride are suspended in 1600 parts of dry tetrachloroethane. The suspension is chilled to 5° C. and 267 parts of anhydrous aluminum chloride are added. The mixture is agitated for 1 hour at 0–5° C. and then for 48 hours at room temperature. The mixture is quenched by pouring into 2000 parts of ice containing 400 parts of concentrated hydrochloric acid. The solvent is removed by steam distillation and the granular precipitate of β-(1,5-dimethoxy-4-naphthoyl)propionic acid is removed by filtration. This material is pulverized and then dissolved in 5000 parts of boiling water containing 120 parts of sodium hydroxide. The hot solution is filtered and the filtrate is acidified. The precipitate of purified β-(1,5-dimethoxy-4-naphthoyl)propionic acid is removed by filtration, washed with water, and dried at 65° C. It melts at 171–172° C. after recrystallization from isopropanol.

10 parts of finely powdered β-(1,5-dimethoxy-4-naphthoyl)propionic acid and 100 parts of tetrachloroethane are agitated and 20 parts of anhydrous aluminum chloride are added. The temperature rises to about 45° C. during the agitation. The mixture is then heated and agitated at 60° C. for 20 minutes. It is then poured into ice containing 24 parts of concentrated hydrochloric acid. The solvent is removed by steam distillation and the residue is chilled. A bright yellow crystalline precipitate of β-(1,5-dihydroxy-4-naphthoyl)propionic acid separates. This is removed by filtration, washed with cold water, and dried. After recrystallization from 15% alcohol in the presence of decolorizing charcoal, the acid melts at 168–169° C. with decomposition. By further recrystallization from 50% acetic acid, employing activated charcoal, dark yellow crystals melting at about 176° C. (with decomposition) are obtained. A mixed melting point with β-(1,5-dimethoxy-4-naphthoyl)propionic acid was 150–155° C. β-(1,5-Dihydroxy-4-naphthoyl)propionic acid has the following structural formula

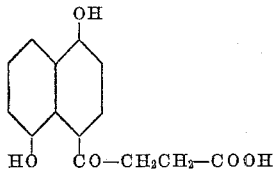

*Example 2*

By the condensation of 32 parts of adipic anhydride with 47 parts of 1,5-dimethoxynaphthalene in 400 parts of dry tetrachloroethane in the presence of 67 parts of anhydrous aluminum chloride at 0–5° C., according to the general method of Example 1, there is obtained ω-(1,5-dimethoxy-4-naphthoyl)valeric acid. This acid can be demethylated with anhydrous aluminum chloride in tetrachloroethane by the foregoing process to form ω-(1,5-dihydroxy-4-naphthoyl)-caproic acid, which has the formula

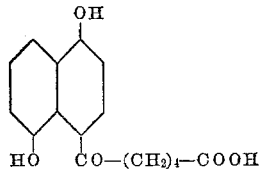

*Example 3*

To an agitated suspension of 122 parts of 1,5-diacetoxynaphthalene (prepared by acetylating 1,5-dihydroxynaphthalene with acetic anhydride in pyridine) and 55 parts of succinic anhydride in 600 parts of nitrobenzene at 3–5° C. are added in portions 147 parts of anhydrous aluminum chloride. The temperature is kept below 5° C. during the addition and for 2 hours afterward, good agitation being maintained throughout. The reaction mixture is then allowed to stand at room temperature overnight. It is finally quenched with an excess of ice and muriatic acid and the solvent is removed by steam distillation. The residue is chilled and filtered and the crude acid is taken up in 5% sodium carbonate solution, treated with activated charcoal and filtered. The filtrate is chilled and acidified, and the resulting precipitate is removed by filtration. The product is then dissolved in 180 parts of alcohol containing 150 parts of concentrated hydrochloric acid. The solution is refluxed for 20 minutes, diluted with 1500 parts of water and cooled. A precipitate of β-(1,5-dihydroxy-2-naphthoyl)propionic acid forms. This acid is collected on a filter, washed well with water and dried. It has the formula

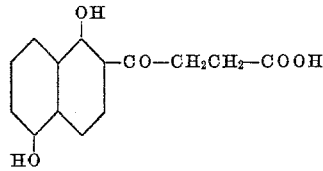

I claim:

1. A member of the group consisting of a keto acid of the formula

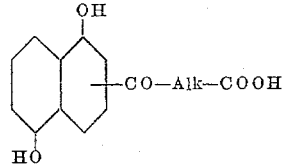

and salts thereof, wherein Alk is in alkylene radical containing from two to five carbon atoms, inclusive.

2. β-(1,5-Dihydroxy-4-naphthoyl)propionic acid.
3. ω-(1,5-Dihydroxy-4-naphthoyl)caproic acid.
4. β-(1,5-Dihydroxy-2-naphthoyl)propionic acid.

References Cited in the file of this patent

UNITED STATES PATENTS

| 2,589,223 | Burtner | Mar. 18, 1952 |
| 2,590,086 | Burtner | Mar. 25, 1952 |

OTHER REFERENCES

Bentley et al.: J. Chem. Soc. (London), vol. 91, p. 44 (1907).

Dey et al.: J. Chem. Soc. (London), vol. 125, pp. 563–4 (1924).

Beilstein (Handbuch, 4th Ed.), vol. 10, p. 341 (1927).

Beilstein (Handbuch, 4th Ed., 1st Sup.), vol. 10, p. 470 (1932).

Gulati et al.: J. Chem. Soc. (London), vol. 1936, pp. 267–9.

Desai et al.: Chem. Abstracts, col. 3038 (1937).